Jan. 14, 1969  H. N. K. PATON  3,421,663
MATERIAL DISCHARGING DEVICE FOR CONTAINERS
Filed Jan. 24, 1967  Sheet 2 of 9
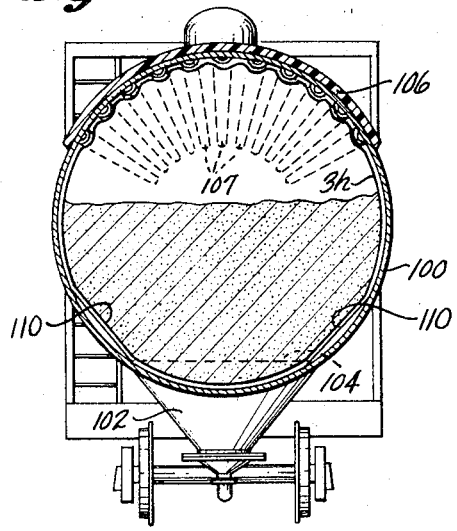
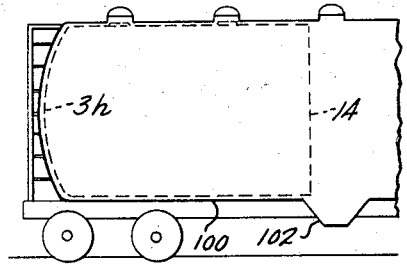
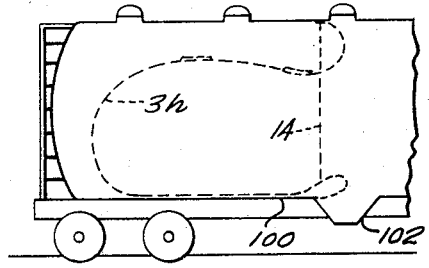
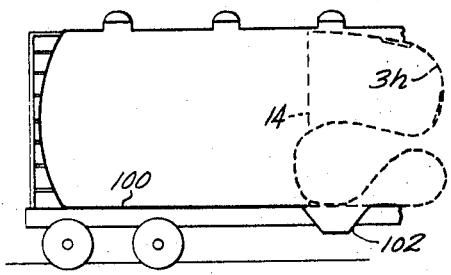
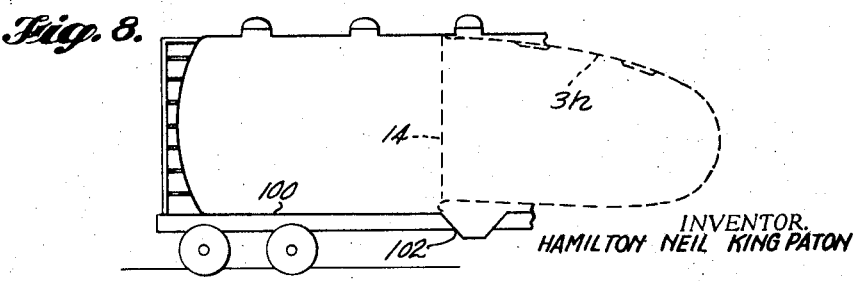
INVENTOR.
HAMILTON NEIL KING PATON
BY
ATTORNEY

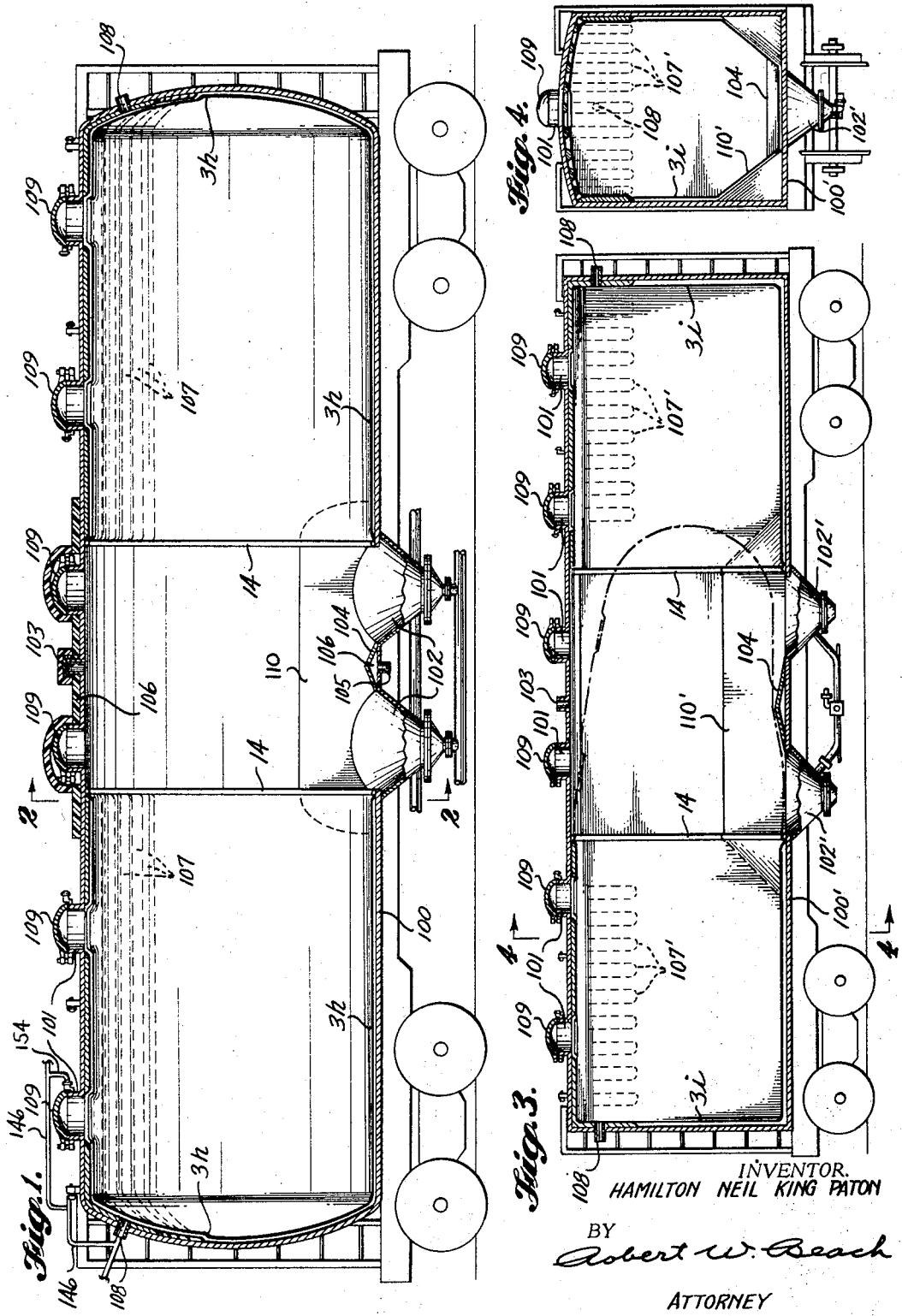

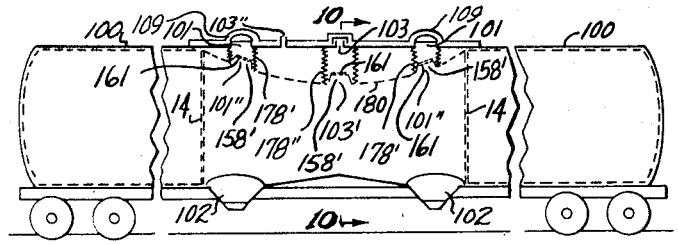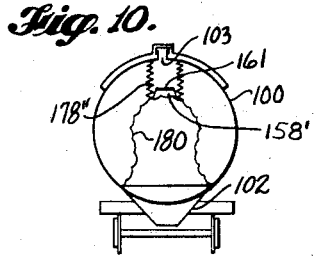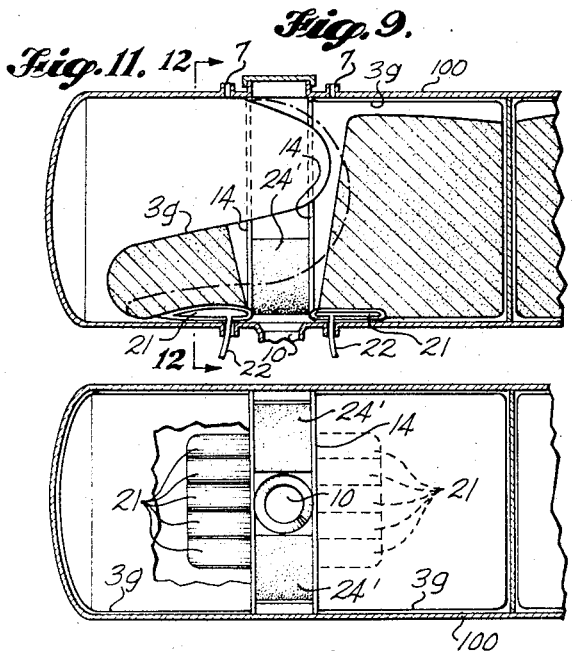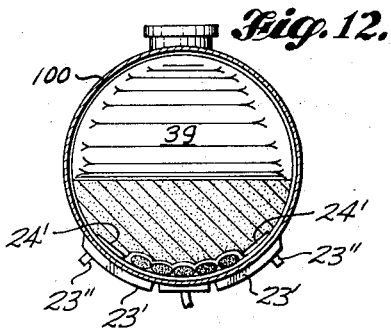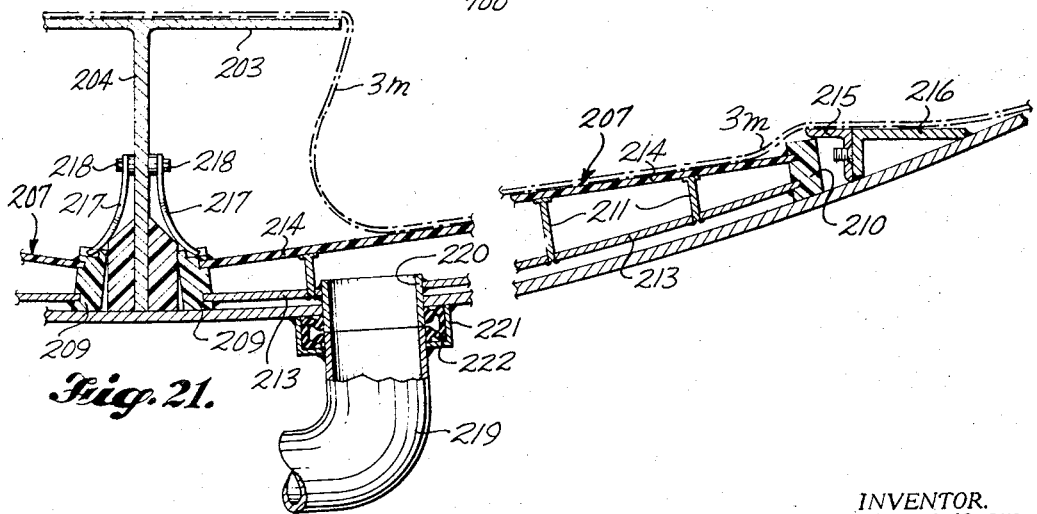
INVENTOR.
HAMILTON NEIL KING PATON
BY
Robert W. Beach
ATTORNEY

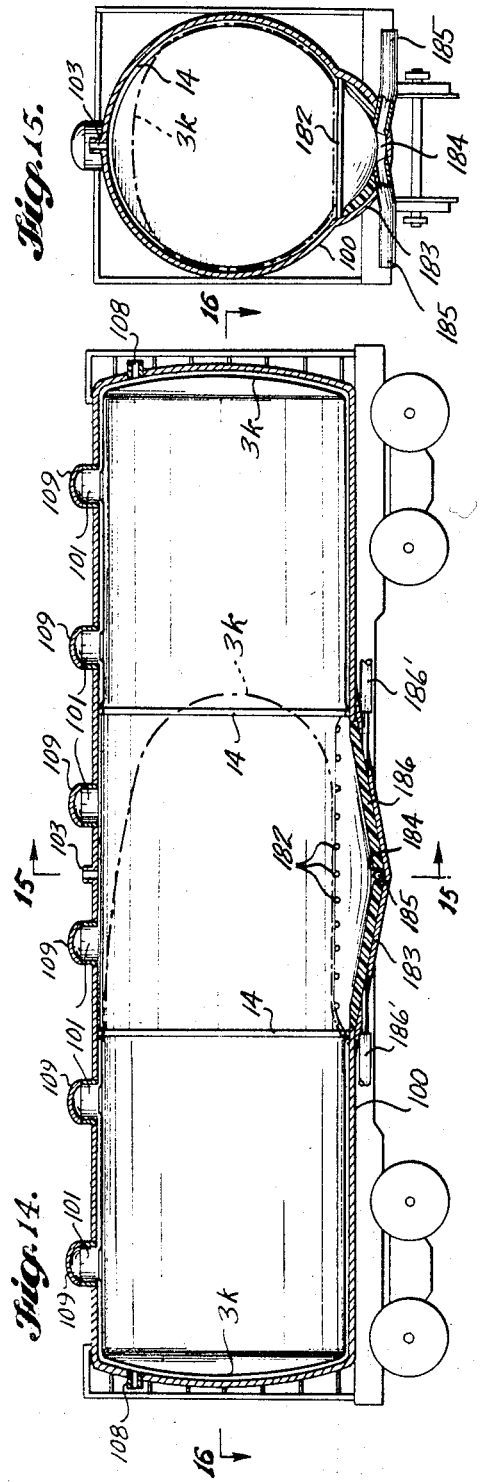
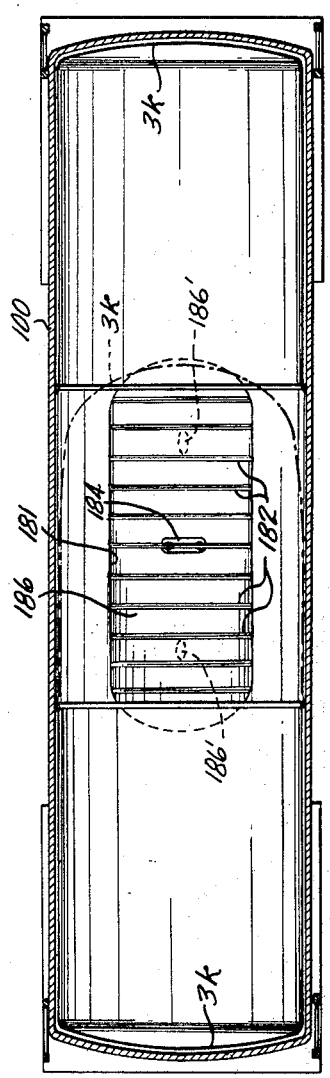

INVENTOR.
HAMILTON NEIL KING PATON
BY
Robert W. Beach
ATTORNEY

Jan. 14, 1969    H. N. K. PATON    3,421,663
MATERIAL DISCHARGING DEVICE FOR CONTAINERS
Filed Jan. 24, 1967    Sheet 6 of 9
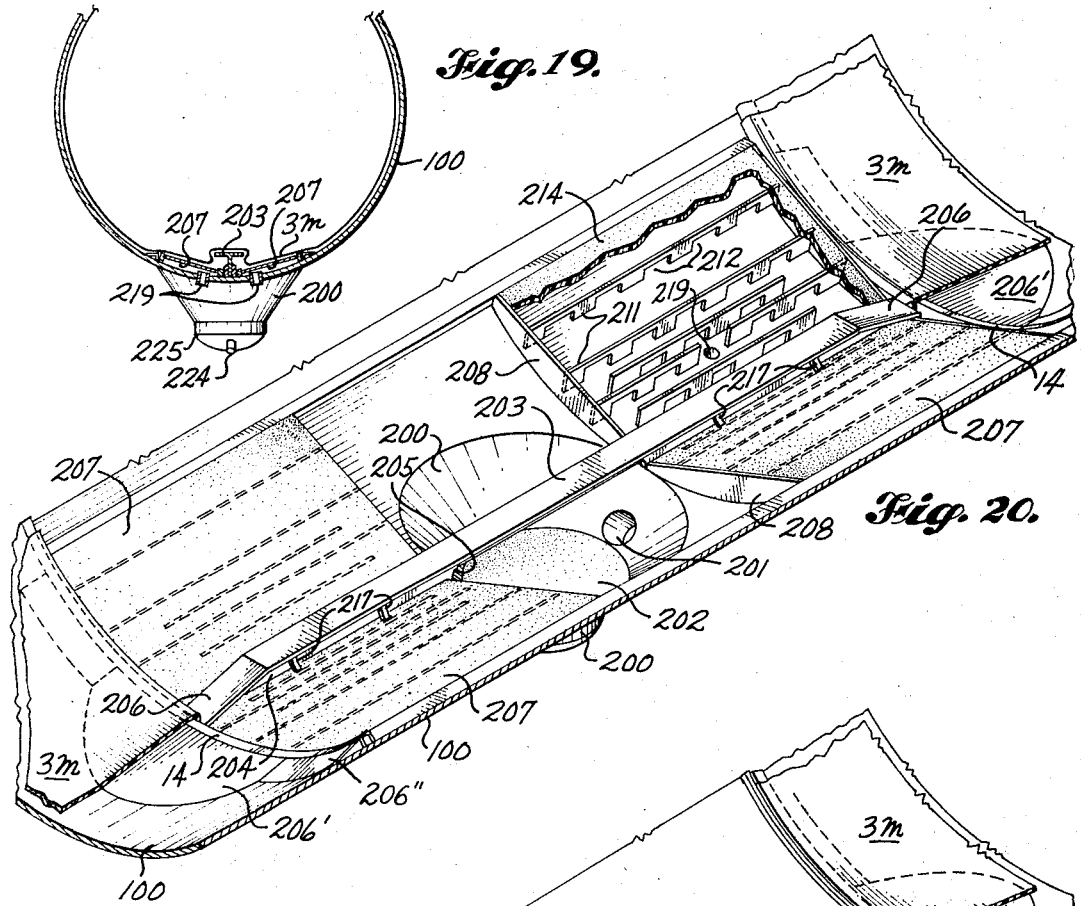
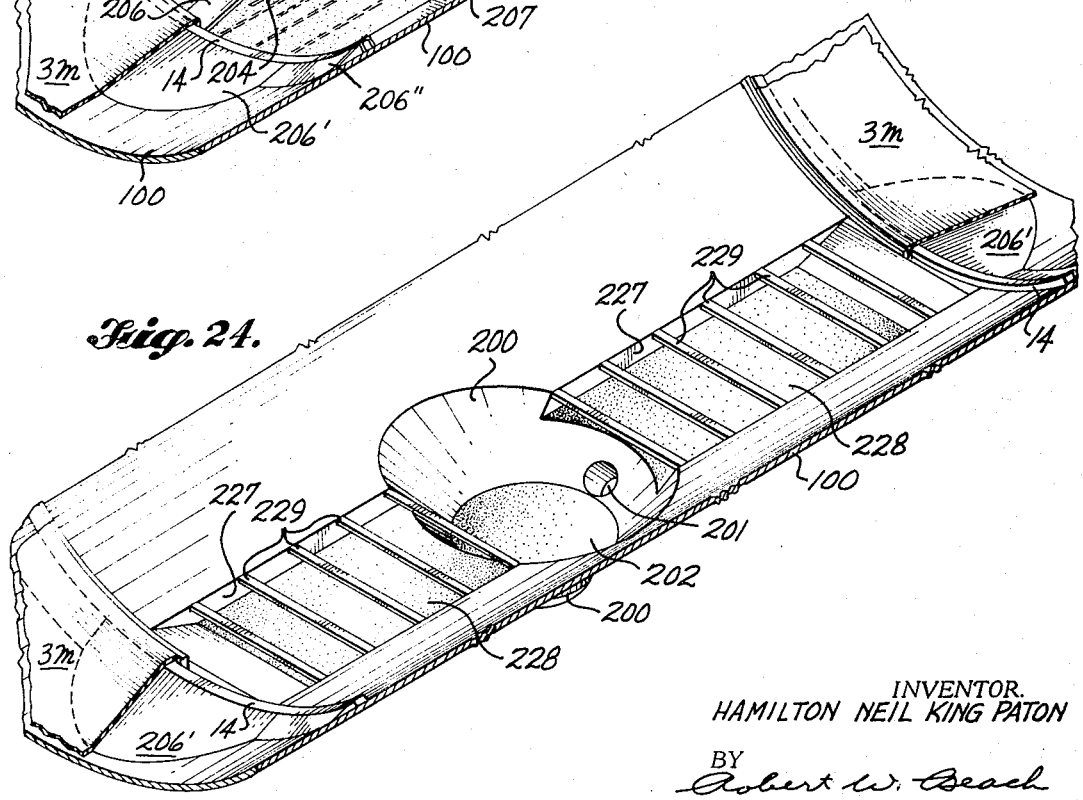
INVENTOR.
HAMILTON NEIL KING PATON
BY
ATTORNEY

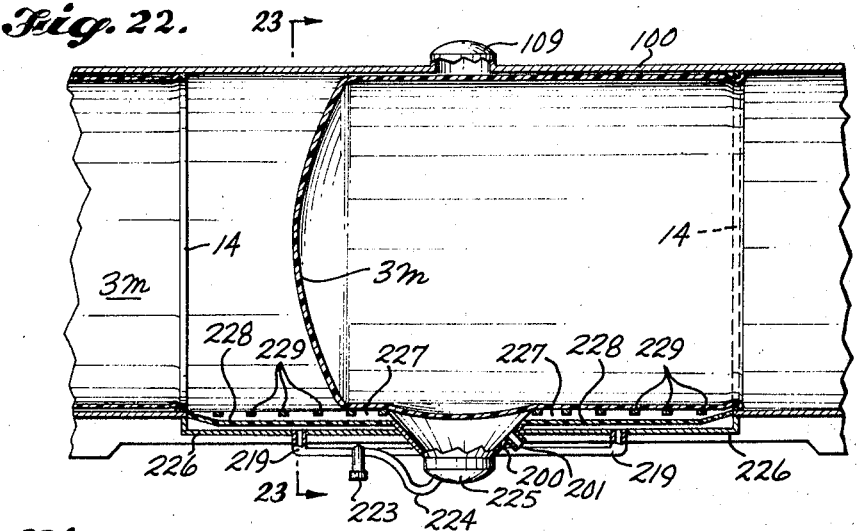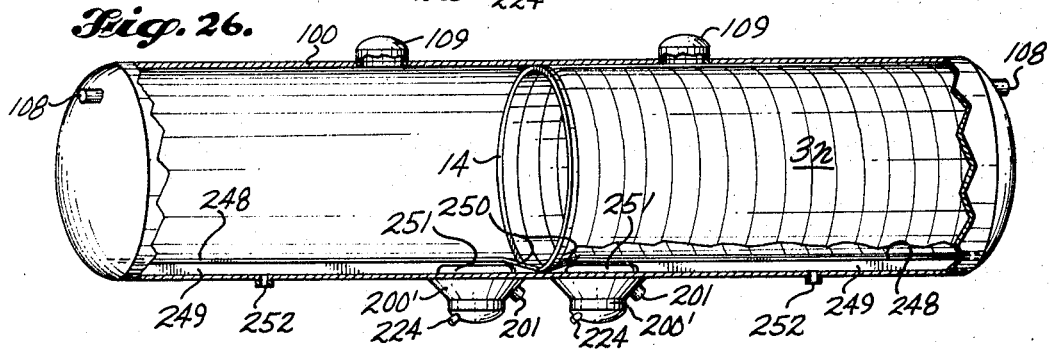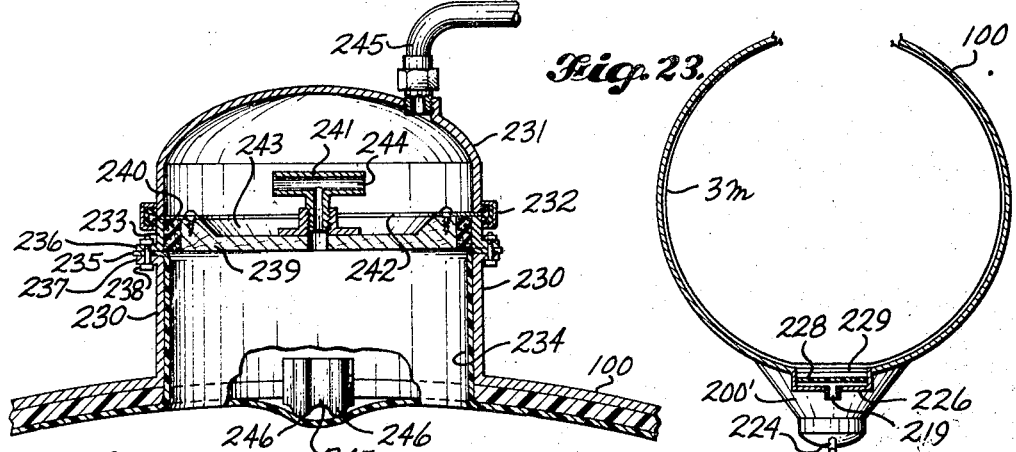

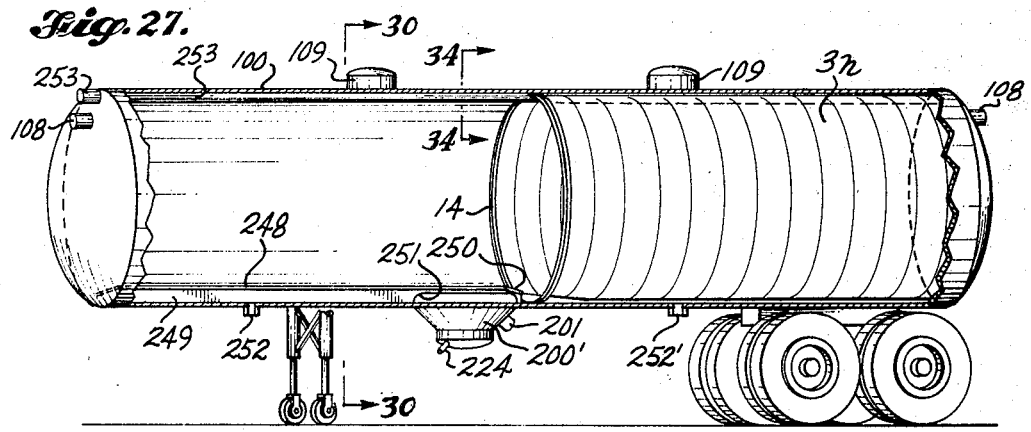
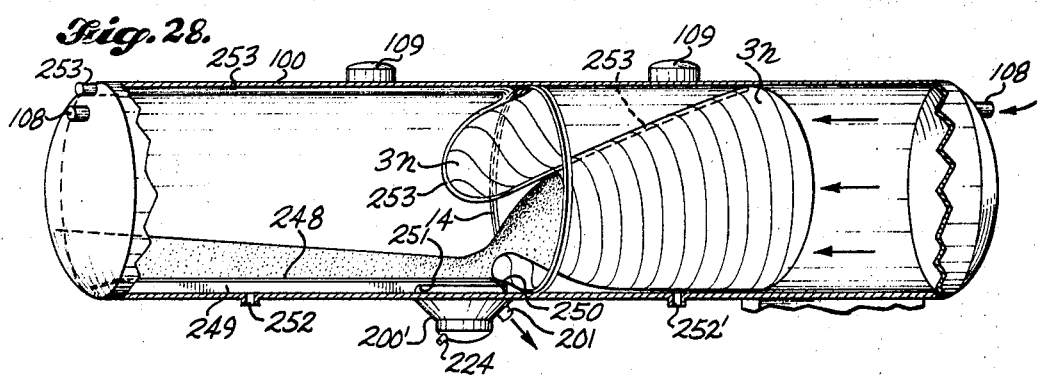
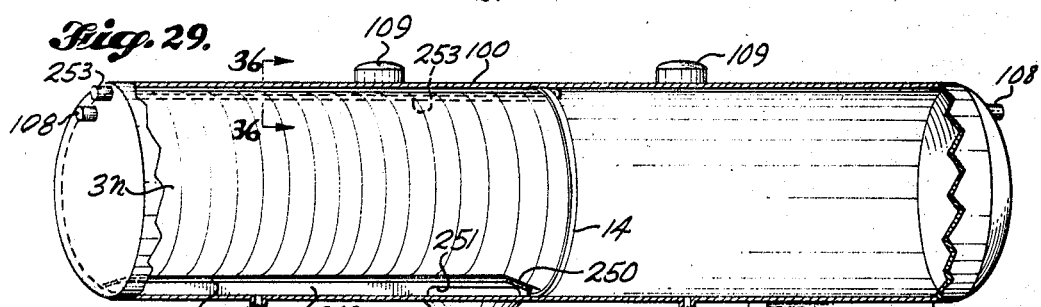
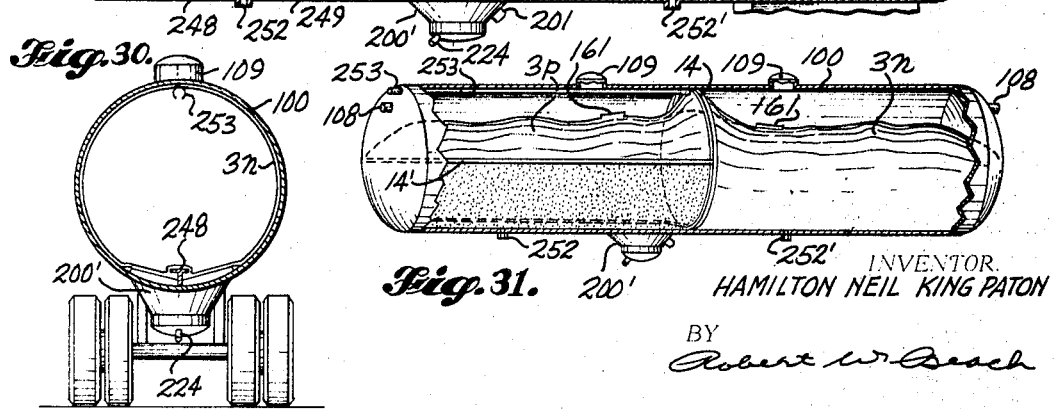

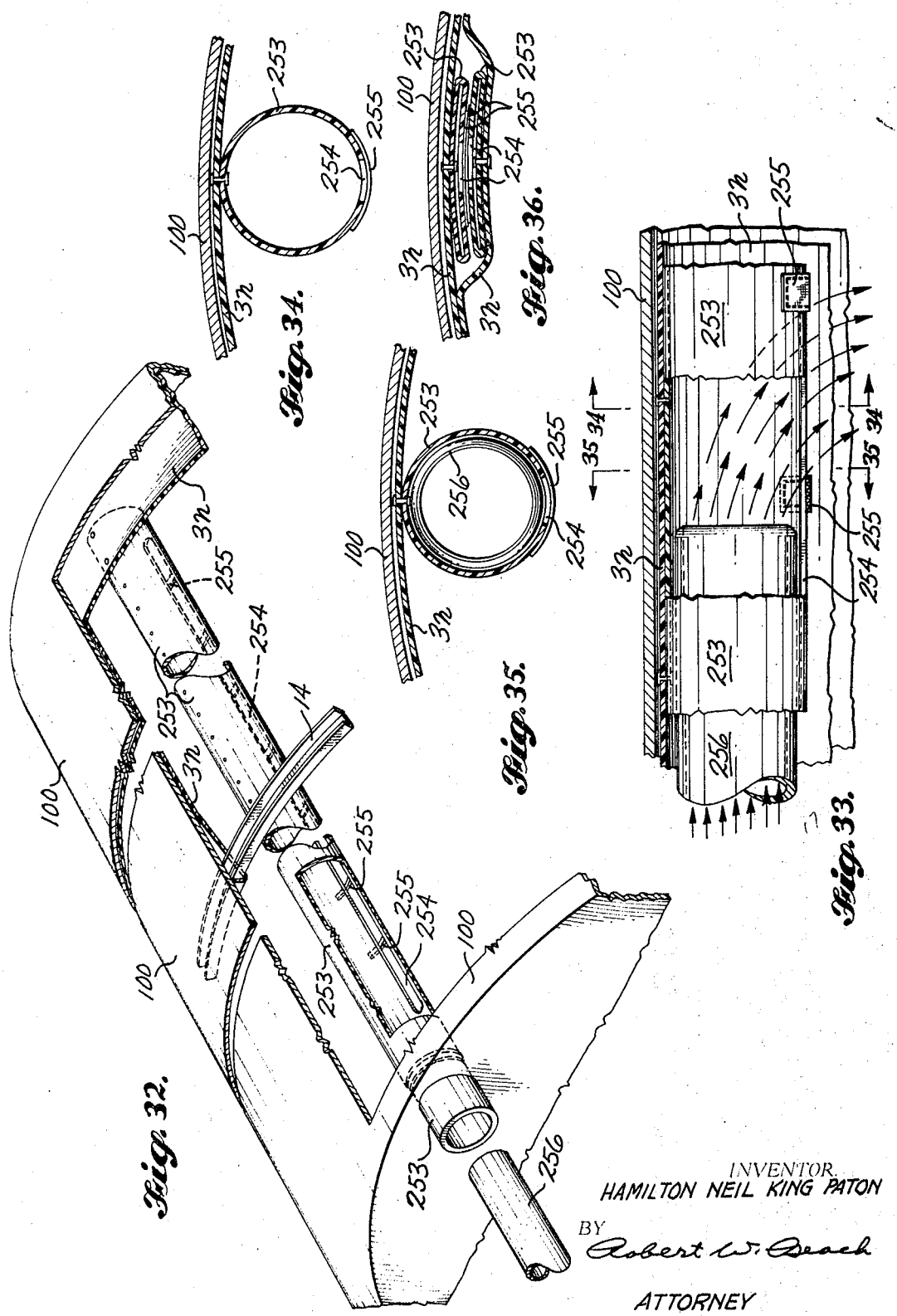

United States Patent Office 3,421,663
Patented Jan. 14, 1969

3,421,663
MATERIAL DISCHARGING DEVICE FOR CONTAINERS
Hamilton Neil King Paton, Seattle, Wash., assignor to Dynabulk Corporation, Bellevue, Wash., a corporation of Washington
Continuation-in-part of application Ser. No. 408,467, Oct. 30, 1964, which is a continuation-in-part of application Ser. No. 307,447, Sept. 9, 1963. This application Jan. 24, 1967, Ser. No. 611,366
U.S. Cl. 222—193        20 Claims
Int. Cl. B67d 5/54

ABSTRACT OF THE DISCLOSURE

In a horizontally elongated container, a cup-shaped membrane has its margin secured in an upright plane enabling the membrane to move from a position lining one end of the container to an inside-out position for discharging discrete material from its interior. Such material can be moved to an outlet port by being fluidized with air emanating from floor panels. A ledge extending longitudinally of the container above the floor panels can support the membrane during its inversion to keep it from clogging the discharge outlet. By attaching its margin centrally of the container, the membrane forms a barrier enabling the full container to be used alternatively for holding products of different types without adulteration. An insulated loading hatch plug having a recess prevents condensation from dropping on the material in the container. Instead of being loaded through such a hatch, the container can be loaded through a flexible ceiling tube having a slotted bottom.

---

This application is a continuation-in-part of my United States patent application Ser. No. 408,467, filed Oct. 30, 1964, now Patent No. 3,351,235, for Internal Membrane Mechanism and Method for Unloading Material from Containers, which is a continuation-in-part of my United States patent application Ser. No. 307,447, filed Sept. 9, 1963, for Methods of Densifying and Deterring Deterioration and Contamination of Discrete Particle Material in a Container. The present invention relates to apparatus for unloading material from containers, and particularly material composed of particles which may be very small, such as in cement or flour, or comparatively large, as in grain or pellets.

An important object of the present invention is to provide a membrane in a container which can be manipulated to assist in discharging material from the container by pressure of the membrane on such material. Preferably pressure of the membrane on the material is effected by providing a differential fluid pressure on opposite sides of the membrane, the pressure being higher in the space between the membrane and the wall of the container. Such pressure differential can be effected either by reducing the pressure in the material-receiving space within the container below atmospheric pressure or by increasing the pressure between the membrane and the container wall to a pressure above atmospheric pressure, or both.

Another object is to provide a plurality of membranes of cup shape in a rigid container which are of reversible character so that they can turn inside out. In one position such membranes can engage a rigid wall of the container for support. The edge portion of such a membrane can be attached around the container wall in an upright plane.

It is also an object of the present invention to provide a membrane which can be manipulated effectively to expedite initial discharge from a container of discrete particle material, which can be used advantageously to complete substatnially the operation of discharging material from a container and which can generally facilitate the operation of discharging discrete particle material from a container. Such manipulation of the membrane can be accomplished most effectively by producing a differential fluid pressure on opposite sides of the membrane and preferably such fluid is air.

The membrane installation of the present invention can be utilized effectively either in stationary or mobile containers and it is an object to utilize for the membrane a material which is impermeable, substantially inelastic and tough, while being highly flexible, wear resistant and economical. At the same time the membrane material should be inert so as not to contaminate material in the container which is edible or which is subject to deterioration or adulteration.

It is an additional object to provide suitable apertures in the container and/or membrane for supply or discharge of fluid or discrete particle material, and to enable such apertures to be sealed easily in fluid-tight condition. In this connection it is an object to prevent a material discharge aperture in the container from being obstructed by the membrane when the opposite sides of the membrane are subjected to differetnial pressure.

Additional objects of the present invention are to provide equipment which will be effective for storing and handling discrete particle materials, whether such material is composed of very fine particels or is composed of coarse particles or pieces, and to provide discharging mechanism which can readily be adapted to discharge effectively material composed of fine particles or material comopsed of coarse particles.

A further object is to provide a special aeration arrangement used in conjunction with the membranes to effect rapid discharge of small particle material from a container and to enable such discharge to be effected from a large area adjacent to a membrane installation to propel to a discharge opening material initially moved toward such opening by movement of a membrane.

Another object is to provide an installation in the container for effecting such rapid emptying of the container, yet which can be removed from operative position sufficiently to enable the container to be cleaned easily and thoroughly.

In utilizing a container for holding particulate material which can be deteriorated by moisture it is an object to deter condensation of moisture at the loading ports in the top of the container.

It is also an object to provide a container having the foregoing advantages in which a single membrane can be utilized as a divider which in one position will enable the entire volume of the container to be filled with one type of material and in another position will enable the entire volume of the container to be filled with another type of material without any wall area contacted by one material also being contacted by the other material. In accomplishing this object one of such materials can be liquid if desired.

The foregoing objects can be accomplished by membrane installations in containers of various types and shapes having either rigid or flexible walls. The attachment of the membrane to a flexible or a rigid container can be such as to enable the membrane to follow material in the container as it moves toward an outlet and the differential fluid pressure acting on the membrane will press material toward the outlet whether the pressure at the outlet side of the membrane is reduced or the fluid pressure at the side of the membrane opposite the outlet is increased. For this type of operation the liner can be anchored so that the membrane cannot extend over and clog the outlet.

More specifically, an elongated storage chamber has two cup-shaped membranes installed respectively in its opposite end portions which, by differential pressure, can be moved simultaneously toward each other to shift material between them to pack such material into the space between such membranes. The membranes are spaced apart sufficiently far so that each membrane can be inverted completely, that is, turned inside out, for the purpose of moving material toward a discharge opening or openings.

Where two membranes are used the space between the membranes may be less than the length of either membrane, the container being at least twice as long as the longest membrane so that it can reverse completely. Alternatively, each of such two membranes can be shorter than the space between the membranes and outlet means can be provided which supplement the operation of the membranes to excite the material for inducing its movement to a discharge port by increasing the effect of gravity without increasing the component of gravity along the surface supporting the material by increasing the slope of such surface toward the discharge port. Such supplemental excitation means may be of the aeration type or the vibration type, or both. In particular such aeration means can be provided in combination with means to prevent a membrane moving into vertical registry with and above such aeration means from clogging such aeration means. Such anti-clogging means may take the form of a grating overlying the aeration means to support a membrane, or elongated means for forming a ledge along the aeration means for engagement by the membranes.

Instead of providing two membranes in opposite end portions of an elongated container, a single cup-shaped membrane can be utilized. If such membrane is anchored at the center of an elongated container and its axial extent is at least equal to, or slightly greater than, one-half of the length of the container, such membrane can be inverted to be disposed in lining relationship to either end portion of the container. The container then could be loaded with the membrane in either position so that the membrane would constitute a separator for accommodating one type of material in the container with the membrane in one lining position and, subsequently, with the liner in its other lining position, for accommodating a different type of material.

Aeration means utilized with the membranes includes porous sheet material, such as porous polyethylene, or resiliently compressible mats, reinforced sufficiently to support the load of material in the container. Aeration means units can be removably installed in the container so that they can be removed or displaced to facilitate cleaning of the bottom of the container.

Material can be loaded into such a container through a loading port closable with an insulating plug to deter condensation. Alternatively a flexible conduit can be provided in conjunction with a membrane through which liquid or particulate material can be loaded into the container.

FIGURE 1 is a longitudinal section through a railway tank car, and FIGURE 2 is a transverse section through such railway car taken on line 2—2 of FIGURE 1.

FIGURE 3 is a longitudinal section through a boxcar type of container, and FIGURE 4 is a transverse section taken on line 4—4 of FIGURE 3.

FIGURES 5, 6, 7 and 8 are somewhat diagrammatic side elevations of one end portion of a railway car equipped with a membrane according to the present invention, showing such membrane in various operating positions which it may occupy during a tank-unloading operation.

FIGURE 9 is a side elevation of a tank car including a modified membrane installation showing the central portion in section, and FIGURE 10 is a transverse section on line 10—10 of FIGURE 9.

FIGURE 11 is a vertical longitudinal section through one end portion of a container generally of the type shown in FIGURE 1, but having a plurality of sections in tandem, each section containing a pair of membranes and such membranes having a different type of membrane bottom construction. FIGURE 12 is a transverse vertical section through the container taken on line 12—12 of FIGURE 11. FIGURE 13 is a central horizontal longitudinal section through the same container when the container is empty, having parts of the membrane broken away.

FIGURE 14 is a longitudinal vertical section through a railway tank car generally of the type shown in FIGURE 1, illustrating a different type of outlet construction, and FIGURE 15 is a transverse vertical section taken on line 15—15 of FIGURE 14. FIGURE 16 is a horizontal longitudinal section through the railway car on line 16—16 of FIGURE 14.

Figure 17:
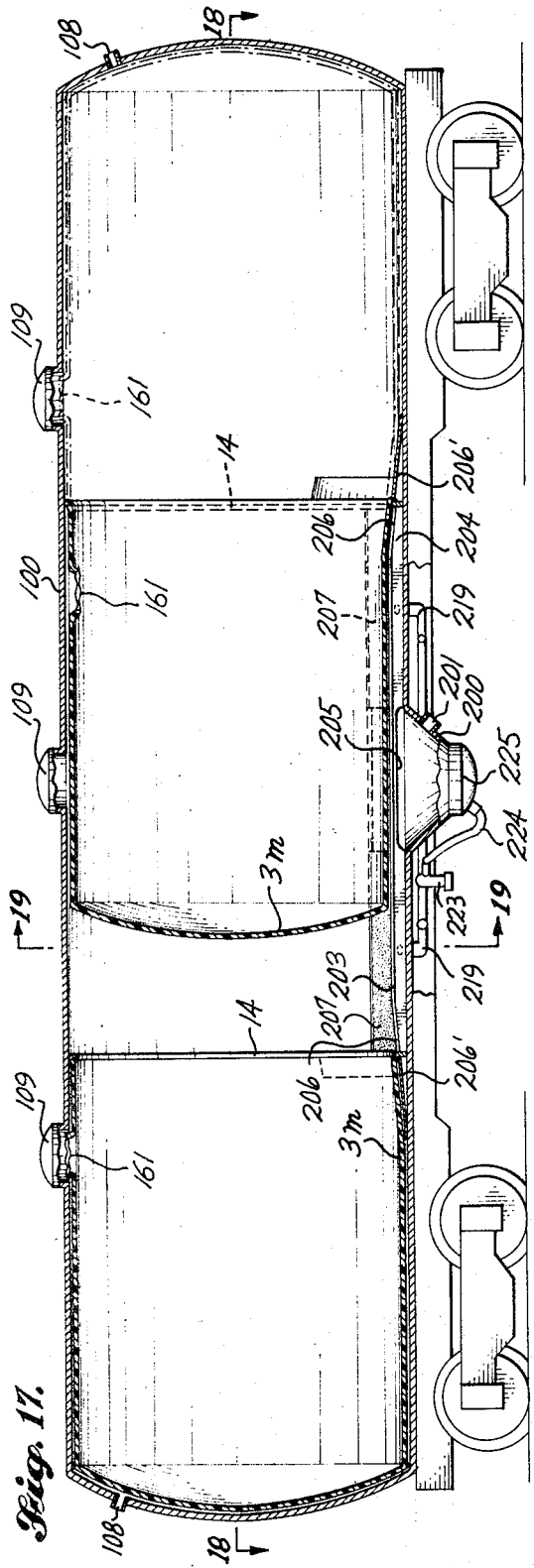
Figure 18:
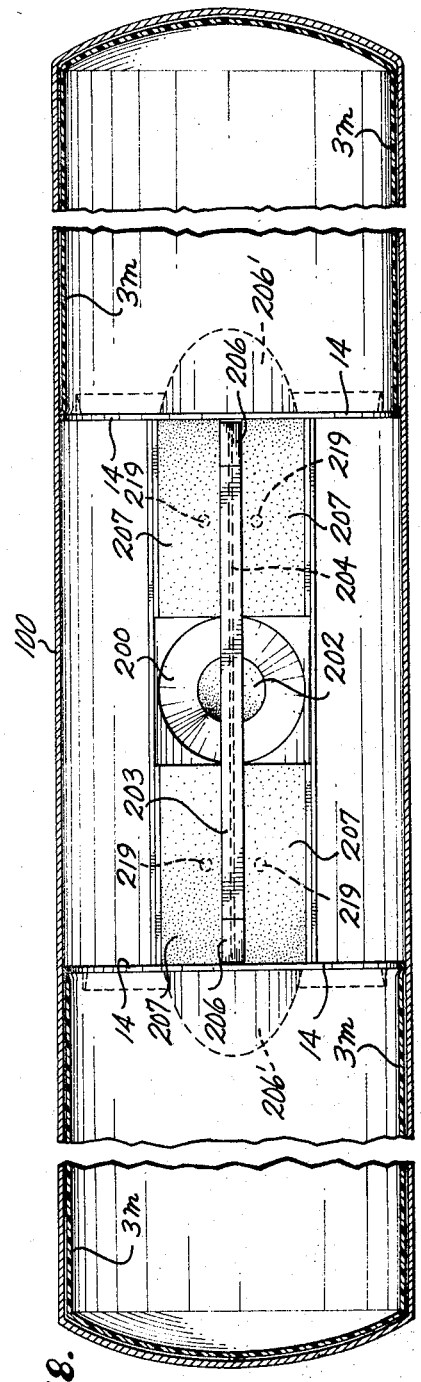

FIGURE 17 is a longitudinal vertical section through a railway car having a different type of membrane installation, and FIGURE 18 is a longitudinal horizontal section through such railway car taken on line 18—18 of FIGURE 17.

FIGURE 19 is a partial vertical transverse section through the same railway car taken on line 19—19 of FIGURE 17.

FIGURE 20 is an enlarged detail top perspective showing discharge means installed in the railway car of FIGURES 17, 18 and 19, and FIGURE 21 (on drawing sheet 3) is a further enlaged detail vertical section through the aeration means.

FIGURE 22 is a fragmentary longitudinal vertical section through a railway tank car generally of the type shown in FIGURES 17, 18 and 19, but having a different type of discharge means. FIGURE 23 is a transverse vertical section through the container on line 23—23 of FIGURE 22. FIGURE 24 is an enlarged fragmentary top perspective of a portion of the railway car shown in FIGURES 22 and 23, illustrating the discharge mechanism.

FIGURE 25 is a detail vertical transverse section through a loading port which may be used in containers of the present invention.

FIGURE 26 is a side elevation of still a different type of container equipped with only a single membrane, parts being broken away.

FIGURE 27 is a side elevation of still another container according to the present invention, having parts broken away.

FIGURES 28 and 29 are side elevations of the container shown in FIGURE 27, parts being broken away and with other parts shown in different positions. FIGURE 30 is a vertical transverse section through such container taken on line 30—30 of FIGURE 27.

FIGURE 31 is a side elevation of a container generally similar to the container shown in FIGURES 27, 28, 29 and 30, but having a modified membrane installation.

FIGURE 32 is a detail top perspective of a roof portion of the container shown in FIGURE 27 with parts broken away. FIGURE 33 is a detail longitudinal vertical section through the roof portion of the same container. FIGURE 34 is a fragmentary transverse section through the roof portion of such container, taken on lines 34—34 of FIGURES 27 and 33. FIGURE 35 is a fragmentary transverse section through the roof portion of such container taken along line 35—35 of FIGURE 33. FIGURE 36 is a fragmentary transverse section through the roof portion of the container on line 36—36 of FIGURE 29.

A principal function of the membrane installation of the present invention is to facilitate unloading of discrete particle material or sludges or slurries from a container by exerting controlled pressure on the material for moving it while, at the same time, if desired, protecting the container in which the membrane is installed from being subjected to an internal pressure below atmospheric pressure. This principle can be utilized whether the container is a stationary storage container or a transportation container, such as a tank truck or tank trailer, a railway tank car or a marine vessel.

The membrane installations of the present invention are especially concerned with containers for storing or transporting discrete particle material, which term is intended to embrace any material having reasonable flow characteristics including fine powdered material such as flour or cement; granular material such as sugar, salt or sand; coarse particle material such as whole grain or corn kernels; chunky material such as pellets, pulp chips, briquets and crushed limestone; small objects such as corn cobs, fruit, for example oranges, and vegetables, for example potatoes; and other materials or irregular shape, as long as particles of the mass are or can be made discrete. All of such products are included within the term discrete particle material because all of them have the characteristics of not being liquid, of their particles not adhering into a mass and of forming a reasonably steep angle of repose when piled. It should be understood that the specific items mentioned are only intended as examples to illustrate material having the characteristics pertinent to utilization of the present invention.

A principal application for the present invention is in rail cars, which may take the form of either a tank car, shown in FIGURES 1 and 2, or a boxcar, shown in FIGURES 3 and 4. The tanks shown in FIGURES 1, 2 and 9 to 13, for example, may either be stationary, or may be carried on a rail car, a truck or a trailer, a ship or an airplane. In each instance the membrane 3h in FIGURE 1 should be of relatively strong and tough very flexible sheet material, which preferably is dimensionally stable.

Such material may be a fabric rendered air impermeable and waterproof, such as urethane-coated Dacron fabric, or the membrane can be of nonwoven material such as polyester resin sheet, available under the trade name Mylar. Such membrane materials are to be understood as merely representative. In FIGURES 1 and 2, and 9 to 13, inclusive, the container or tank 100 could be used as a stationary inplant storage container, or a land transportation container such as a tank car, a tank truck, a semitrailer tank, a trailer tank or a boxcar. Because of the elongated character of the container it is desirable for it have a plurality of filler ports 109 spaced along its length. The tanks shown in FIGURES 1 and 2 and FIGURES 9 and 10 have a plurality of discharge ports 102 which may correspond in location to filler ports lengthwise of the tank.

In each tank compartment a plurality of flexible membrane partitions are provided which conform to the internal shape of the container so that in one position a membrane section will serve as a liner for a portion of the tank. In each case at least a portion of the liner must be in roof-lining relationship as opposed to only wall-lining relationship. The membrane can be moved to and held up in such lining position, however, only by exerting on the liner a greater fluid pressure on its side away from the container wall than on the wall side. In FIGURES 1, 2 and 9 to 13 the tank is shown as being of cylindrical shape and cup-shaped membrane elements are of substantially circular cross section. They are reversible and must be able to turn completely inside out. In each instance membrane sections are located at opposite sides of the circumferential band of the tank where the central filler ports 109 and the discharge ports 102 are.

In FIGURE 1 each cylindrical cup-shaped membrane section has a curved end or bottom to fit a tank end. The peripheral edges of such membrane sections are suitably secured by fluid-tight joints 14 extending circumferentially of the container adjacent to filler ports 109 and discharge ports 102 in FIGURES 1 and 2 and FIGURES 9 and 10. Each membrane element may shift its position relative to its edge joint 14 from a position in which it constitutes a liner for one portion of the tank into a fully reversed position where the side of the membrane which was convex when the membrane was a liner has become concave, and the side of the membrane which was concave at the time it functioned as a liner has become convex.

As shown in FIGURE 1, connections 108 or openings through the wall of the container 100 are provided in the wall portions of the container to be engaged by the membrane sections 3h as liners. By connecting a suction source to an opening 108, therefore, the membrane section 3h for the corresponding portion of the container can be pressed by air under higher pressure at the opposite side of the membrane into substantially contiguous engagement with the container wall. In order to supply adequate air under pressure for this purpose it may be necessary to open a loading port 109 or a discharge port 102, or a vent 103. When a section of the container is to be filled with discrete particle material both of its openings 108 are connected to a suction source, or such openings are vented and pressure fluid supplied inside the tank section, so that both membrane sections 3h are moved into tank-lining position, as shown in FIGURE 1.

In FIGURES 1 to 13 the containers 100 and 100′ have a plurality of loading ports 101 located at spaced intervals along their tops. In the tanks of FIGURES 1 to 10 the material is unloaded through discharge hoppers 102 or 102′ of which there are preferably two, located in the central portion of the tank between the membrane attachment lines 14. It is necessary to provide a discharge opening of adequate size through which to move the discrete particle material quickly. If a larger opening is desired it is usually not practical simply to enlarge a single discharge opening because the size of the hopper cone cuts too far into the side wall of the tank. On the other hand, if the tank is to be pressurized, it is not feasible simply to elongate the discharge opening lengthwise of the tank to expedite discharge of the material and to assist in conveying it away from the tank, because such a slot would decrease the circumferential strength of the tank too greatly. It is possible, however, to obtain a sufficiently great area of discharge opening by providing two, or even three, circular openings spaced lengthwise of the tank. A vent opening 103 is located in the top of the tank preferably at approximately the center.

In the particular tanks shown in FIGURES 1 and 3 six loading ports are shown, two of which are located between the membrane attachment lines 14, two more of such ports at the top of that portion of the tank which can be lined by one membrane 3h in one end portion of the tank, and two other ports at the top of the other end portion of the tank which can be occupied by another membrane. The purpose of providing such a large number of loading ports is to expedite loading of the car by enabling material to be fed into more than one or all of such loading ports simultaneously and to enable the material to be distributed more uniformly along the length of the car as the tank approaches the filled condition and thus utilize fully the interior of the container.

Use of the two discharge hoppers 102 and 102′ deters plugging of the outlet by the membranes during an unloading operation. Material can be dislodged from the space between the hoppers by a bridge 104 preferably inclined downward toward the two hoppers. Flow of material from such bridge into each of the hoppers can be expedited by exciting the material supported by the bridge either by supplying air under pressure through a connection 105 to the cavity 106 beneath the bridge and perforating the bridge so that air can escape through it to loosen or excite particulate material above the bridge, and/or the bridge can be connected resiliently to the adjacent portions of the tank and provision made for vibrating the bridge to loosen or excite material for flow from it into the hoppers. Such excitation of the material will increase the effectiveness of the component of the force of gravity down the slope of the bridge toward the discharge hoppers to effect sliding of the material without the magnitude of such gravitational component being increased by increasing the slope of the bridge toward the hoppers. In some cases it is preferable to supply little or no air to the material because of the hygroscopic nature of the particular product, such as sugar, salt or urea. Such air as may be used can be refrigerated to reduce its moisture content.

At the central portion of the tank between the membrane attachment lines 14 a layer of insulation 106 can be provided extending over approximately the upper quadrant of the tank. During slow loading under very low temperature conditions it may be desirable to provide additional insulation in the form of ribs 107 between the membranes proper and the tank wall proper to prevent condensation occurring inside the membranes, particularly if it should be necessary to interrupt such loading operation for a substantial period of time. These ribs preferably are parallel but may extend either longitudinally of the tank, as shown in FIGURE 1, and then radially toward its center over the upper portions of the tank end walls, as shown in FIGURES 1 and 2, or such ribs may extend circumferentially of the tank or even in some other direction. Such ribs 107 should be made of insulating material such as rigid or semirigid foam plastic, or the ribs may be of the inflatable type.

The operation of the membranes 3h is shown generally in FIGURES 5 to 8, inclusive. When it is desired to load the tank a suction source is connected to each of the pipes 108, which extends through the shell of the tank 100 to communicate with the space between the shell and a membrane 3h. Only a very small suction is required for this purpose, such as one-half a pound per square inch, or even less. At the same time the vent 103 is open to supply air under atmospheric pressure to the interiors of the membranes. Such atmospheric pressure exerted on the membrane interiors will press the membranes away from their attachment lines 14 into the tank wall-lining relationship shown in FIGURE 1. Alternatively, the connections 108 can simply be vented and a source of air under a small pressure can be connected to the pipe 103 to provide a differential in pressure on opposite sides of the membranes. This latter method of providing a pressure differential on opposite sides of the membranes is, however, less desirable during the tank loading operation. In either case the groove between two adjacent ribs 107 would afford a channel for flow of air between the connection 108 and all parts of the space between the membrane and the wall lengthwise of the membrane and container, or equivalent flow channel provision should be made.

While FIGURES 1 and 2 show the membranes 3h installed in a tank of cylindrical cross section such membranes can be utilized in a tank of a different shape, such as the tank 100' shown in FIGURES 3 and 4, which has a cross section of substantially rectangular shape. This tank is shown as serving as the body of a railway boxcar. In this instance the membranes 3i are also of substantially rectangular cross section, corresponding in shape to the interior of the tank 100', so that when suction is applied to the connections 108 and the vent 103 is open the membranes will be drawn into lining relationship to the interior of the tank, as shown in FIGURES 3 and 4.

In the tank 100' of rectangular cross section ribs 107' are provided which extend across the roof of the tank transversely of its length and part way down the side walls. These ribs constitute means for spacing the membrane away from the inner wall of the tank to avoid contiguous contact with it, which would tend to promote condensation, as discussed in connection with the ribs 107 of FIGURES 1 and 2. To expedite loading, a plurality of loading ports 101 are provided in the top of the tank shown in FIGURES 3 and 4, and unloading of such tank can be accomplished through two or more central discharge hoppers 102'. The structure of the loading ports 101, their covers 109 and the discharge hoppers 102' and related mechanism may be essentially the same as the corresponding elements embodied in the tank construction illustrated in FIGURES 1 and 2.

The functions of the membranes 3h of FIGURES 1 and 2 and 3i of FIGURES 3 and 4, are generally the same. When the tank is being filled with material the cup-shaped membranes must be held in substantially contiguous engagement with the inner wall of those portions of the tank with which such membranes are in registry, as illustrated generally in FIGURE 5. In this position the membranes can accommodate the greatest possible quantity of material in the tank. When the tank has been filled initially, the filling openings can be closed and a small amount of differential pressure, such as one pound per square inch, applied to the membranes by a suction source connected to port 103 in FIGURES 1 and 3 while having the connections 108 open to atmosphere or, in case of FIGURE 1, while supplying pressurized gas to the two connections 108. The differential pressure of the gas will force the two membranes toward the center to compact the loaded material.

When the tank is to be unloaded, such as when the vehicle has reached its destination, the discharge ports 102 are opened, and usually either suction or compressed air, or both, is supplied to the discharge conduit. Air, preferably under pressure, is supplied to one of the openings 108. Unless suction is applied to the discharge port 102 such air must be under pressure. Even if air pressure is supplied within the membranes to force the stored material out, the higher fluid pressure acting on the side of the membrane section 3h opposite the discharge port will press the membrane in the corresponding end compartment down against the material and then toward the outlet, as shown in FIGURE 6.

The pressure behind the left membrane section will urge it into a reverse curve shape, so as to roll the upper part of the pile of material in the left end of the container compartment toward a position above the discharge port 102. It should be noted particularly that it is not necessary for the material to be lifted by such reverse curve rolling of the membrane section, but such section shifts the upper portion of the body of the material principally laterally. As material continues to be urged toward a position over the discharge port 102 the upper portion of the membrane element is peeled inwardly from the wall of the container, as indicated at the left of FIGURE 6. Although the weight of the material tends to hold the lower portion of the membrane element down while the upper portion of the element continues to bulge progressively farther to the right, the membrane bottom has a tendency to roll out over the outlet.

Such fluid pressure differential can continue to be applied beneficially to the membrane until enough of the contents in such end of the compartment has been discharged so that a considerable portion of the membrane will bear against the standing face of the material in the opposite end of the compartment in a container having the proportions shown in FIGURE 1. Air, again preferably under pressure, will then be supplied to the connection 108 of the other compartment end, while reducing the fluid pressure between the container wall and the first membrane section to a value below the pressure within the container. A suction source at a pressure lower than any suction applied to the discharge port 102 can be connected to the first opening 108, or such first opening can be vented if the tank interior is pressurized. Consequently, the first membrane section, at the left of FIGURE 1, will be pressed back again into a container lining position such as shown in FIGURE 5.

When differential fluid pressure is thus applied to the right membrane section 3h, its upper portion in turn is urged toward the central portion of the container in FIGURE 1 and moves material to a position over the discharge port 102 until eventually it assumes a position fully to the left of its edge connection to the container when all of the material has been moved out of the right end of the container. The right opening 108 is then subjected to a pressure lower than that within the central portion of the container so that the latter pressure will press the right membrane element 3h to the right back again into lining relationship to the tank wall. Air, preferably under pressure, is then again supplied to the opening 108 communicating with the left end of the container in FIGURE 1 so that the left membrane section will again be urged to the right away from its container-lining position in a reverse curve shape as shown in FIGURE 6. By this action the upper portion of the body of material in the left end of the container will be rolled to the right into a position above the discharge port. The left membrane section will bulge progressively farther to the right, beyond the position of FIGURE 7, because the right end of the compartment is empty, and be peeled progressively from the left end of the container compartment until this membrane section has moved into the position of FIGURE 8 in which it has reversed completely or been turned inside out.

While theoretically such second manipulation of the left membrane section in the container of FIGURE 1 will have moved all the material in the left end of the container into the discharge outlet, actually the lower portion of this liner may have rolled in return bent shape across the outlet as indicated in FIGURE 7, so that some of such material will have been transferred onto the lower portion of the right membrane section 3h. When the left membrane has been reversed completely, therefore, it will be desirable to connect a suction source to the opening 108 communicating with the left end of the container and vent the container, or pressurize the container and vent left opening 108, so as to effect movement of the left liner membrane section 3h back into container-lining position. A source of air under low pressure is then connected to the right opening 108, so that the right membrane section will move gently through the reverse curve shape like that shown in FIGURES 6 and 7 into completely reversed position. This further manipulation of the right membrane section may empty the container completely, but some material may be transferred back onto the left membrane section and can be cleaned out manually.

When the container has thus been emptied suction sources can be connected to the openings 108 to return the membrane sections to their container-lining positions. The valve in each discharge port 102 can then be closed and a cover applied to it preparatory to the tank being filled again.

In some instances it may be found that when air under pressure is supplied to a connection 108 communicating with the space between a wall of the container 100 and a membrane section 3h, a portion of the membrane nearer the discharge port 102 may tend to move away from the container wall lower portion before a portion farther from such port moves away from the lower portion of the container because of the fluid pressure beneath the membrane and the fact that the angle of repose of the material face slopes to this point and therefore the least weight is applied to the membrane at such point. Thus the lower portion of the membrane may assume a reverse curve shape, as indicated in FIGURES 6 and 7, forming a pocket. In the prior United States application Ser. No. 408,467 expedients are disclosed for the purpose of deterring such movement of the membrane. In the present invention, however, provision is made to prevent the discharge opening being completely obstructed by such movement of a membrane without attempting to deter such movement.

In the membrane installation shown in FIGURE 3 the attaching means 14 for the open ends of the two membranes 3i are located considerably farther apart than the attaching means 14 for the open ends of the membranes 3h, shown in FIGURE 1. The length of the container must exceed twice the axial length of each of the membranes in order to enable both membranes to turn inside out completely. Moreover, the space between the membrane attach lines must be more than half of the axial length of each membrane, unless a special type of membrane control mechanism to prevent or reduce the formation of the bottom reverse curve such as shown in FIGURES 6 and 7 is employed. Otherwise it will not be possible to obtain a complete unloading operation of the container simply by manipulation of the membranes. Also, it is important that the discharge hoppers 102, or 102', be located respectively adjacent to the two attaching means 14 for the open ends of the membranes, so as to prevent the accumulation of discrete material on a shelf between such attaching means and a discharge hopper.

The first step in the unloading operation is to arrange for proper removal of material through the two hoppers, which will be described in greater detail later. When material can flow out of the discharge ports the material immediately above the hoppers 102, or 102', will move down through them first. Slope sheets 110 in FIGURES 1 and 2 and 110' in FIGURES 3 and 4 will facilitate movement of material from the side zones of the longitudinally central compartment of the container down into the hoppers. Aeration of the bridge 104, or vibration of the bridge, will deflect material between the hoppers into one or the other of them. Discharge of material from a tank structure such as shown in FIGURE 3 could be expedited further by providing an additional hopper 102' between the two there shown, which would enable the bridge 104 to be reduced greatly in size and to be replaced by two bridges instead of one.

When the discrete particle material in the space between the attachment means 14 has been discharged through the discharge hoppers and the faces of the bodies of material stored within the membranes have assumed a stable angle of repose, or even before such a stable condition is reached, gas under pressure may be supplied to one of the connections 108 to provide higher pressure between the corresponding membrane and the container wall than within such membrane. Gas thus supplied may have a pressure of as much as 50 pounds per square inch, for example, but the differential pressure across the membrane should not exceed 1½ pounds per square inch, to force the membrane to move into the central portion of the tank in turning inside out generally as illustrated by the broken lines in FIGURES 5, 6, 7 and 8, as discussed above.

As discharge of material continues the membrane will move farther toward inverted position, generally in the manner shown in FIGURE 7, until the forward bulge of the membrane engages the inclined slope face of the body of material stored within the opposite membrane. Because the membrane-attaching means are closer together in the arrangement shown in FIGURE 1 than in the arrangement shown in FIGURE 3, this engagement of the membrane with the face of material will occur sooner in the tank of FIGURE 1 than in that to FIGURE 3. In any event, when this situation does occur the supply of gas under pressure to the connection 108 behind the manipulated membrane should be cut off and suction should be applied to this connection, or such connection should be vented and gas under pressure supplied within such membrane, so that the membrane will be returned to its initial wall-lining condition.

Next, gas under pressure is supplied to the other connection 108 so as to force the other membrane out of wall-lining position and cause it to move through the inverting sequence illustrated in broken lines in FIGURES 6 and 7. Because most of the stored material has been emptied from the container as the result of the manipulation of the first membrane described, movement of the second membrane to be manipulated can progress from the position shown in FIGURE 7 to that of FIGURE 8, where the membrane will be inverted completely. It will be found that as the membrane approaches the completely inverted position it will dump a residue of the material stored in it which has lodged in the bottom crease of such membrane, as illustrated in FIGURE 7. If the attaching means 14 are spaced apart sufficiently far in relation to the axial length of the membrane being inverted, as shown in FIGURE 3, such residue will be dumped within the central portion of the container between the attaching means 14 so that it will be discharged through a hopper 102'.

On the other hand, if the axial extent of the membrane is sufficiently greater than the distance between the two membrane attaching means, as shown in FIGURE 1, at least a portion of such residue will probably be dumped beyond the central portion of the container. In that case it will be necessary to discontinue the application of differential pressure to the membrane being manipulated and to apply opposite differential pressure to such membrane for reversing movement of that membrane into wall-lining position again, and then to supply gas under pressure for the second time to the other connection 108 for again inverting the membrane which was first inverted in order to scavenge all of the stored material from the container.

In the membrane installation illustrated in FIGURES 9 and 10 the cup-shaped membranes installed in opposite ends of the tank 100 may be similar to any of the membrane arrangements discussed above. In this embodiment, however, a further membrane 180 is provided which extends between the two attaching means 14 of the end membranes. The membrane 180 is substantially a sleeve, which would be of generally cylindrical shape if the container 100 were cylindrical. The lower portion of this membrane is secured around the discharge ports 102 and the opposite sides of the intermediate bridge 104 in cases where this is provided. In this installation it will be noted that the discharge ports 102 and the attachment means 14 are spaced lengthwise of the container a distance much greater than the spacing of the discharge ports and attachment means in either FIGURE 1 or FIGURE 3.

Two filling ports 101 are shown in the container between the attachment means 14 for the end membranes, and the central membrane 180 has apertures 101" in it disposed in registry with the loading ports 101. Also, this membrane has in it an aperture 103' which is in registry with the connection 103 for venting the interior of the container between the end membranes, or supplying to such central portion air under pressure, or connecting to it a suction source.

In FIGURES 11, 12 and 13 the pockets 21 in the lower portion of the membrane element 3g are elongated longitudinally of the container. Each pocket is therefore straight and the row of pockets in side-by-side relationship is of arcuate shape. Fluid under pressure is supplied to these pockets by a connection 22 and the pockets of the series are in communication with each other so that all of the pockets are inflated at the same time to provide a rigid inflated section. The pockets are preferably tapered in thickness away from the discharge port 10, as shown in FIGURE 11, and each pocket may be tapered in width from the discharge port. Such tapering facilitates curling of the pocket group beginning at the end farthest from the discharge port when such pockets are partially deflated. Alternatively, these pockets, when loosely filled with beads of metal, glass or plastic, as shown in FIGURE 12, can be rigidified by partial evacuation and their flexibility restored by bleeding air into them again.

It will be noted that the portion of the bottom of the membrane section 3g which is rigidified by inflation of a row of pockets need not be very extensive, its function being simply to prevent the membrane lower portion from starting to roll into a return bend over the discharge outlet 10, instead of being peeled progressively from the container wall. Such portion of the membrane element can simply be deflated in a controlled manner progressively toward the discharge port 10 near the end of the material-discharging operation to enable the bottom portion of the membrane to be peeled progressively from the container bottom without rolling into a return band shape.

By using of the various forms of membrane installation described material in a container can be moved into the space between the joints 14 securing the edges of adjacent membrane sections to a rigid container. Most of the material thus moved into registry with the discharge port lengthwise of a horizontally elongated container will be discharged readily through such port. Where the container is of cylindrical cross section, however, and the discharge port 10 has only a small extent circumferentially of the container, it would be possible for some material to lodge between the joints 14 and circumferentially adjacent to the discharge port without passing through it.

Flow of material from between the membrane joints 14 through even the small outlet 10 can be insured by installing between such joints rigid arcuate panels 24' of porous material, as shown in FIGURES 11, 12 and 13, through which air can be supplied to loosen particle material for movement over such panels. Such porous material panels 24' preferably are of porous polyethylene. Air can be supplied under pressure to such panels through connections 23" to air distribution ducts 23' which can be located either externally of the container, as shown in FIGURE 12, or within the container.

The membranes 3k in the container 100 of FIGURES 14 to 16 are similar to the membranes 3i in FIGURE 3, except that they are of circular cross section like the membranes 3h of FIGURE 1. The membrane-attaching means 14 for the skirts of the membrane are, however, spaced apart similarly to the attaching means of FIGURE 3. Also the filling ports 101 and covers 109 and the connection 103 are similar to these parts in FIGURE 1. The principal difference in the container of FIGURES 14 to 16 over those shown in FIGURES 1 to 4 is in the discharge arrangement.

In the bottom of the car 100, as shown best in FIGURES 15 and 16, is provided a wide slot 181 of a length substantially equal to the spacing between the attaching means 14 for the skirts of the two cup-shaped membranes 3k. While normally such slot would greatly weaken the car and make it impractical to pressurize it, the hoop strength of the central portion of the car is preserved by connecting opposite sides of the slot by tie rods 182. The slot is then closed by a shell 183 beneath it which preferably is rigid and is of generally cylindrical or conical arcuate section having a curvature with a radius much shorter than the radius of curvature of the tank 100. By use of this double shell construction in the central portion of the tank with tie rods 182 joining the opposite sides of the slot between such sections, the hoop strength of the structure is maintained so that it will be highly resistant to internal pressure.

Because the slot 181 preferably is of a width which will prevent any appreciable accumulation of particulate material along the sides of the central portion of the tank, and because the length of such slot is at least substantially as great as the spacing between the attaching means 14 for the two membranes, the entire central portion of the tank between the membrane-attaching means can be emptied by gravity. Also, the slot will be sufficiently long, as shown in FIGURE 14, so that a membrane 3k in its completely inverted position cannot close entirely the area of the slot. In order to empty that part of the central portion below the tie rods 182, however, it may be desirable to provide some arrangement supplementing gravity to move material to the central outlet opening 184 from which the material is discharged through one or the other or both of outlet pipes 185. For fine material the lower shell portion 183 may be covered by a porous mat 186 through which air can be supplied, or this portion of the tank bottom can be vibrated to place the material in suspension so that the material will flow readily to the outlet opening 184 despite the gradual slope of the shell portion 183 longitudinally of the tank toward such outlet. Coarse material can be moved mechanically such as by screw or flight conveyors.

The tank 100 of the railway car shown in FIGURES 17 to 21 is generally similar to the tank of the railway car shown in FIGURES 1 and 2. In this instance, however, the installation for unloading discrete particle material from the tank differs to some extent from that illustrated in FIGURES 1 and 2. As in that tank, however, the material unloading apparatus installation of FIGURES 17 and 18 includes two cup-shaped membranes 3m installed in opposite ends of the elongated tank, respectively. The margin of the membrane opening is secured to the inner wall of the tank substantially in a vertical plane by an anchoring device 14.

The cup-shaped membranes 3m of the tank 100 in FIGURES 17 and 18 are of substantially equal extent axially of the container, but such axial extent is considerably less in proportion to the length of the container than the axial extent of the cup-shaped membranes 3h of FIGURES 1 and 2. Since each of these membranes must be capable of being moved into lining relationship to one end portion of the elongated container, the distance between the attachment means 14 and the nearer end of the container will be substantially equal to the axial extent of the membrane. In this instance, however, such membrane axial extent is a much shorter proportion of the total length of the tank 100 than in the structure of FIGURE 1.

In FIGURE 1 the distance between the attachment means 14 for the two membranes is less than the axial extent of either membrane. In the installation of FIGURES 17 and 18, however, the distance between the two attachment means 14 for the membranes is considerably greater than the axial extent of either membrane. Moreover, in the tank structure of FIGURE 1 the discharge ports or hoppers are located respectively immediately adjacent to the respective attaching means 14. In the tank of FIGURES 17 and 18, on the contrary, as in the tank of FIGURES 14, 15 and 16, only one discharge port is provided and it is located generally centrally between the attaching means 14. In FIGURES 17 and 18, however, the attaching means are located even farther apart with respect to the axial extent of a cup-shaped membrane than are the attaching means 14 in the tank of FIGURES 14 and 16.

It is quite feasible to locate the attaching means 14 as far apart as shown in FIGURES 17 and 18, or even farther, because of the effectiveness of the discharge means for discrete particle material located between the membrane-attaching means 14 in this construction. Such discharge means includes, in addition to the discharge hopper 200, gas-fluidizing means and structure which channel the flow of the discrete particle material to the discharge hopper 200 and out through the discharge port 201. Flow of the discrete particle material from the hopper through such discharge port is facilitated by the emanation of fluidizing gas from the porous floor 202 of the hopper, which preferably is made of porous polyethylene sheet, although it may be of resilient polyurethane foam mat.

Discrete particle material is conveyed from the space between the two membrane attachment means 14 to the discharge hopper 200 by air flowing along a channel or channels extending longitudinally of the elongated tank. Each of the membranes 3m is supported above such conveying channels by a ledge 203 spaced upward from the bottom of the tank by a flange 204. The flange forming the ledge 203 and the web 204 preferably are formed integrally as a T bar, as shown best in FIGURE 21. The edge of the T bar flange can be welded to the shell of the tank if such members are steel or aluminum alloy.

FIGURES 17 and 18 show that the T bar extends continuously between the two membrane-attaching means 14 and bridges the discharge hopper. The lower portion of the web 204 can be cut out at 205 above the discharge hopper if desired to increase the opening into the hopper. Each end portion of the T bar web is tapered toward the end of the T bar so that the end portions 206 of the ledge-forming flange slope downward toward the membrane-attaching means. Beyond such membrane-attaching means lower fairing plates 206′ or ramps of generally circular segmental shape as shown in FIGURE 20 are inclined from the membrane-attaching means to the tank floor. Upper fairing plates or ramps 206″ extend upwardly from such lower fairing plates and slope from the projecting membrane-attaching means to the container wall. As a membrane element 3m moves from a wall-lining position at the right of FIGURE 17 into an inverted position as shown in the center of FIGURE 17, the lower portion of the membrane will slide up the ramps to and over the membrane-attaching means 14 and will then be supported by and drape over the T bar to form passages on opposite sides of the web 204 and beneath the flange 203 of the T bar, as shown in FIGURES 19 and 21.

At each side of the T bar 203, 204 are located gas-fluidizing panels 207. These panels include end plates or strips 208 the length of which extend transversely of the T bar and longitudinal side members 209 and 210 shown in FIGURE 21. Intermediate ribs 211 extending parallel to the sides 209 and 210 of the panel have notches 212 in their lower edges, shown in FIGURE 20. The portions of the lower edges between such notches engage the bottom plate 213 of the panel. The upper side of the panel is formed by a member 214 of porous sheet, such as of polyethylene, or a resilient mat preferably of polyurethane foam material, bridging between the ribs 211, as shown in FIGURE 21.

It is desirable for the aeration or gas-fluidizing panels 207 to be removable from their positions alongside the T bar shown in FIGURES 18 and 20. At the outer edge each panel is an angle 215 which is secured to an anchoring angle 216 so that the flange of the angle 215 projects toward the T bar. Such flange is spaced from the tank wall sufficiently to receive beneath it the edge member 210 of the panel as shown in FIGURE 21. The opposite edge member of the panel is lodged alongside the mounting for the T bar, and this edge of the panel can be held in place by latching fingers 217 which are swingably mounted on the T bar flange 204 by pivots 218.

In order to remove an aeration or gas-fluidizing panel the latching fingers 217 are swung upwardly so that the edge member 209 of the panel can be lifted. When this edge member has been swung upward about the edge member 210 as a pivot until the edge member 209 is above the latching finger pivot 218, the panel can be slipped edgewise toward the T bar flange 204 sufficiently to disengage the edge member 210 from beneath the flange of angle 215. The edge member 210 can then be lifted clear of such flange and the panel removed by edgewise movement away from the T bar web.

The spaces between the ribs 211 form a plenum chamber from which air may pass upward through the porous sheet or mat 214. Such air is supplied to the panel through an air supply conduit 219 shown in FIGURES 17, 19 and 21. The end of this air supply conduit fits the end of the nipple 220 which extends through and is secured in an aperture in the lower plate 203 of the aeration panel 207. The abutting ends of the conduit 219 and nipple 220 extend into a junction box 221 containing a sealing gasket 222, which engages both conduit ends to retain them in abutment and prevent escape of air from the joint between them.

In use a suction source will be connected to each of the ports 108 in the opposite ends of the tank 100 shown in FIGURES 17 and 18 to effect movement of the membranes 3m into wall-lining relationship at opposite ends respectively of the tank. With the membranes in this position the membrane ports 161 can be opened and the loading ports 109 opened so that discrete particle material can be loaded into the car tank simultaneously through all three loading ports. As the loading nears completion the membrane ports 161 and end loading ports 109 can be closed. A suction source can then be connected to the central port 109, and a source of air under pressure greater than atmospheric can be connected to ports 108, or such ports can be opened to supply air at atmospheric pressure, to press the membranes 3m down onto the material to compact it. Subsequently the ports 108 can again be connected to a suction source, the end ports 109 and membrane ports 161 can be opened, and additional material can be loaded into the tank through the three loading ports. Such compaction operation can be effected more than once if desired.

After loading of the tank has been completed and the loaded car has been transported to its destination, the discrete particle material can be removed from the tank by following the procedure described above in connection with FIGURES 5, 6, 7 and 8. During the unloading operation air under pressure greater than atmospheric can be supplied to the pipe 223 shown in FIGURE 17, from which it will be conveyed through conduits 219 to the fluidizing panels 207 and through conduit 224 to a plenum chamber in the bottom 225 of the discharge hopper 200. From such plenum chamber the air will flow upward through the fluidizing floor 202 in the discharge hopper to aerate further the discrete particle material passing into the discharge hopper and out through the discharge port 201.

In the early stages of the tank-unloading operation the discrete particle material in the central portion of the tank will drop by gravity into the discharge hopper 200. In the next stage of the unloading operation the material between the membrane-attaching means 14 will be fluidized by air emanating from the gas-fluidizing panels 207, which will cause most of this material to move into the discharge hopper 200 and pass out through the discharge port 201. As the material within the membranes 3m begins to move downward toward the discharge hopper 200, a differential pressure can be applied first to one of the membranes 3m and subsequently to the other of such membranes to move the remainder of the material within such membranes into the central portion of the tank.

As a membrane 3m moves toward its fully inverted position, as shown at the middle of FIGURE 17, the lower portion of such membrane will drape over the ledge formed bt the flange 203 of the T bar, generally as indicated in FIGURES 19 and 21. Such draped membrane bottom portion, a T bar flange portion 203, and the web of the T bar will form passages along opposite sides of the T bar web and beneath the lower portion of the membrane, as shown in FIGURES 19 and 21. Air emanating from the mat 214 will be channeled through such passages toward the discharge hopper 200 and will blow discrete particle material along such passages to the outlet port 201, so as to clean the tank effectively of the last vestiges of the discrete particle material in the tank. If it should be necessary thereafter to clean out the tank, the membranes 3m can be moved into their wall-lining positions, and workmen can enter the interior of the tank either through the center loading port 109 or by removing the bottom 225 of the discharge hopper 200. The fluidizing panels 207 can be removed in the manner explained above to afford access to the tank floor if desired.

The construction of tank 100 and the installation of membranes 3m shown in FIGURES 22 and 23 are substantially the same as shown in and described in connection with FIGURES 17 and 18. The difference in construction of this tank resides in the arrangement of the discharge means being essentially below the bottom of the tank. The discharge hopper 200, discharge port 201 and pressurized air supply conduits 223, 219 and 224 are the same as described in connection with FIGURES 17 and 19. In this instance, however, the fluidizing means is mounted in a pan 226 projecting downward below the general level of the bottom of tank 100, as shown in FIGURES 22, 23 and 24.

In the structure of FIGURES 22, 23 and 24 the side walls 227 of the pan 226 determine the width of the fluidizing sheet or mat 228. This sheet or mat is spaced above the bottom of the pan 226 to provide a plenum chamber, as indicated in FIGURES 22 and 23, through which air supplied by conduit 219 can be distributed for uniform emanation from the upper side of the panel. In order to provide a large area through which air can enter the body of the tank from the pan 226 the top of such pan is essentially open, but its sides are connected by ties 229 for structural purposes comparable to the ties or rods 182 in FIGURES 14, 15 and 16. The ties 229 serve the same general purpose as the bars or rods 182 in constituting a support for the lower portion of a membrane in inverted position, so as to prevent the membrane from clogging the passage between the fluidizing mat 228 and the bars 229 to the discharge hopper 200.

In FIGURE 25 an arrangement is shown for deterring condensation at the central loading port of FIGURES 17 and 22, for example, or, in fact, for any loading port. The coaming 230 upstanding from the roof of the tank 100 is arranged to be closed by the cover 231. The lower edge of this cover carries a sealing or gasket ring 232 engageable with the upper edge of a supplemental ring 233. A plastic insulating liner 234 for the upper portion of the tank has a neck extending up through the coaming and the upper portion 235 of such neck is folded and stretched outward between a lower flange 236 on the lower edge of the auxiliary ring 233, and a flange 237 on the upper edge of the coaming 230. These flanges are secured together to clamp the insulating liner between them by bolts 238.

The provision of the neck portion of the plastic liner 234 will prevent condensation from occurring on the inner side of the coaming 230 during cold weather when the interior of the tank is humid, but condensation would occur on the inner side of the auxiliary ring 233 and on the inner side of the cover 231. To prevent such condensation from dropping through the loading opening into the interior of the tank and wetting material in it, a plug can be used to seal the portion of the loading port structure above the lined coaming. Such plug includes a disk 239 of wood or other non-metallic material having a rim of compressible sealing plastic material 240. The plug can be inserted into the auxiliary ring 233 when the cover 231 is open or removed from such ring by grasping a handle 241 secured to the central portion of the plug. Downward movement of the plug is limited by engagement of the projecting lip of an annular plate 242 secured to the upper side of the plug with the upper edge of the auxiliary ring 233.

The central portion of the plug preferably has in it a depression 243 to catch any condensation which may be formed on the inner side of cover 231 and drop downward. The cross member of the handle 241 may have in it a passage 244 communicating with a passage extending through the stem of the handle to the other side of the plug for affording flow of air through the plug and the pipe 245 connected to the cover 231. The tank 100 can be pressurized by supplying air under pressure to pipe 245 and passage 244, or air can be withdrawn from the interior of the tank through the plug passage and the pipe 245. Moreover, air can flow between the plastic liner 234 and the wall of the tank by providing a member including spaced ribs 246 forming a channel 247 between them which is mounted on the ceiling of the tank and extends around the corner of the loading port behind the neck of insulating material extending up into the coaming.

In FIGURES 26 to 31 a single reversible, cup-shaped membrane 3n is shown. In all of these figures the membrane-attaching means is located centrally between the opposite ends of the elongated tank 100. A loading port 109 is provided for each portion of the tank at opposite sides of the sealing means 14. Connections 108 are provided in opposite ends of these tanks for connection of hoses either to a supply of air under pressure or to a suction source for the purpose of manipulating the cup-shaped membrane between a position in lining relationship to one end of the tank, as shown in FIGURES 26 and 27, and a position in lining relationship to the opposite end of the tank, as shown in FIGURE 29.

The tank structure of FIGURE 26 is intended principally to be used for hauling one type of discrete particle material in the condition shown in FIGURE 26 and a different type of discrete particle material when the membrane 3n is in its inverted condition. In this tank construction two discharge ports 200′ are located near each other at opposite sides of the membrane-attaching means 14. Such discharge hoppers will be isolated from each other by the membrane 3n, and the sealing means 14 forming a barrier between such hoppers. Each compartment of the tank has in it a ledge formed by the flange 248 of a T bar supported from the floor of the tank by its web 249. These T bars extend to the opposite ends of the tank, and their adjacent ends are tapered to provide end sections 250 sloping downward toward each other to meet at the membrane-attaching means 14.

The respective T bars 248, 249 bridge the discharge hoppers 200′. Over such hoppers the lower portions of the webs 249 are cut out to provide a larger opening 251 for the purpose of improving access to the discharge hoppers. Connections 252 are provided in the bottom of the tank through which air under pressure can be supplied to fluidizing panels of the type described in connection with FIGURES 17, 18 and 21, which are not shown in FIGURE 26. The procedure for unloading discrete particle material from the container shown in FIGURE 26 would be generally the same as that described with reference to FIGURES 17 and 18.

While the tank 100 of FIGURES 27, 28 and 29 is shown as installed in a trailer, it will be understood that this type of tank structure could, if desired, be used in a railway car or in a stationary installation. In this instance the structure is intended primarily for transporting discrete particle material when the membrane 3n is in the position shown in FIGURE 27, and the tank is intended to transport liquid when the membrane is in the reversed position of FIGURE 29. Consequently, the tank has only one discharge hopper 200′ with the associated T bar ledge 248, 249, 250 and 251, as described in relation to FIGURE 26. This mechanism would be used in conjunction with fluidizing floor panels and the membrane 3n to unload discrete particle material from the tank in the manner discussed in relation to FIGURES 17 and 18, and illustrated in progress in FIGURE 28 in which the membrane 3n is shown in the act of being inverted.

When the membrane 3n is in the inverted position of FIGURE 29, liquid can be loaded into the tank through the right loading port. At the end of the trip such liquid can be drained from the tank through the discharge port 252′. Unloading of the liquid can be expedited by applying a differential pressure to the membrane 3n, in which the higher pressure is at the side of the membrane at the left of FIGURE 29. For producing such differential pressure air under pressure can be supplied to the tank through the connection 108 at the left end of the tank, as seen in FIGURE 29.

The tank of FIGURE 31 is very similar to that of FIGURES 27, 28 and 29, the difference being that in this instance a further membrane 3p is provided in the left end of the tank, as seen in this figure. Such membrane is not of cup shape, but its edge portion is secured to the tank wall by the securing means 14′ disposed substantially in a horizontal plane. The membrane 3p can be used during loading of the tank to compact the discrete particle material, and during unloading a differential pressure can be applied to such membrane to expedite discharge of the material through the discharge hopper 200′. Loading of such a tank can be effected through the two loading ports in the tank roof and through the corresponding loading openings 161 in the membranes 3n and 3p. This tank also can be utilized for transporting alternatively discrete particle material and liquid, as discussed in connection with FIGURES 27, 28 and 29.

In the tank structures shown in FIGURES 27 to 31 tank-loading apparatus which can be used as an alternative to the left roof-loading port 109 is shown generally, and such loading mechanism is shown in detail in FIGURES 32 to 35. This loading mechanism includes a tube 253 extending along the ceiling portion of the tank and opening outside the tank at the end equipped with the discharge hopper 200′. Such tube extends virtually the full length of the tank, and it is made of readily deformable fabric, rubber or plastic material.

A slot 254 extends along most of the length of the bottom of loading tube 253. At intervals along such slot straps 255 connect opposite edges of the slot to provide sufficient circumferential strength for the tube. The upper portion of the tube to the right of the membrane-attaching means 14 is secured to the inner side of the membrane 3n, so that such tube can collapse or be folded lengthwise as the membrane moves from the position of FIGURE 27 to the position of FIGURE 28 to that of FIGURE 29 without such tube deterring this change in shape of the membrane appreciably. Loading of discrete particle material into the container can be effected through a rigid tube 256, which has an outside diameter slightly smaller than the inside diameter of flexible tube 253 so that the rigid tube can be inserted telescopically lengthwise of the flexible tube in the manner indicated in FIGURES 33 and 35.

When the loading operation is initiated the rigid tube 256 can be inserted into the flexible tube 253 for almost the entire length of the flexible tube. Discrete particle material is then blown through the rigid tube 256 and is discharged from its inner end to pass into the container through the slot 254 in the bottom of the flexible tube. Consequently, the right end portion of the tank 100 as seen in FIGURE 27 will be filled first. As this end portion of the tank is filled, the rigid tube 256 can be withdrawn progressively step-by-step from the tube 253, so as to fill the tank progressively with material from the right end as seen in FIGURE 27 to the left end. When the filling operation has been completed, the rigid tube 256 will have been withdrawn from the flexible tube. The end of the flexible tube can then be plugged in any desired manner. Alternatively, discrete particle material can simply be blown directly into the left end of the flexible tube to fall through the slot 254 until the container is filled up to the tube bottom.

The unloading operaion for a tank which has been loaded in this fashion is the same as that described with reference to FIGURES 27, 28 and 29 and FIGURES 17 and 18. As the membrane 3n moves toward inverted position through the condition shown in FIGURE 28, it will be evident that the flexible tube 253 will be bent into a reverse curve. As has been mentioned, however, such tube is quite flexible so that it will not appreciably deter such deformation of the membrane. When the membrane has attained its completely inverted position of FIGURE 29, the two portions of the tube 253 at opposite sides of the attaching means 14 will be pressed together into flattened condition, as shown in FIGURE 36. Such tube will be sealed from contact with liquid which may be transported in the tank when the membrane is in the position of FIGURE 29.

It will be evident that the tank constructions described above provide a very versatile tank installation and one which can be loaded and unloaded quickly. Moreover, such tank structures require minimum cleaning and maintenance even when used to transport two different types of material at different times.

I claim:
1. A container for discrete particle material comprising a horizontally elongated body, a flexible cup-shaped membrane adapted to be disposed in container-lining relationship with an end wall of said body and with portions of the top, bottom and side walls of said body, and having an end wall in upright position when in such container-lining relationship and top and bottom walls extending from said membrane end wall in generally horizontal position when in such container-lining relationship, attaching means spaced from the opposite ends of said body a distance at least as great as the axial extent of said membrane and securing the rim of said membrane to the walls of said body substantially in an upright plane, discharge means including a discharge port located at the bottom of said body at the side of said attaching means opposite said membrane end wall in container-lining relationship and closer to said attaching means than the distance between said attaching means and said membrane end wall when in such container-lining relationship, means for applying differential fluid pressure to said membrane for inverting it relative to said attaching means from container-lining relationship into a position overlying said discharge port for dumping material from the interior of said membrane toward said discharge port, and exciting means at the discharge port side of said attaching means and adjacent to said discharge port operable to loosen for movement toward said discharge port material overlying said exciting means by increasing the effectiveness of the component of the force of gravity acting toward said discharge port.

2. The container defined in claim 1, in which the discharge means includes at least one discharge port in the bottom portion of the container at one side of the attaching means in addition to the first discharge port, which discharge ports are in communication with each other through the container, and the exciting means is disposed between the discharge ports and is operable to loosen discrete particle material therebetween to flow to at least one of such ports for discharge therethrough.

3. The container defined in claim 2, the exciting means including a bridge sloping oppositely toward said discharge ports between which the bridge is located, and means operable to vibrate said bridge.

4. The container defined in claim 1, in which the exciting means is located adjacent to the discharge port and extends upward from it.

5. The container defined in claim 1, in which the discharge port is located adjacent to the secured edge portion of the membrane.

6. The container defined in claim 1, and a second cup-shaped membrane adapted to be disposed in container-lining relationship with the opposite end wall of the body and with portions of the top, bottom and side walls of the body and having an end wall in upright position when in such container-lining relationship, and top and bottom walls extending from said membrane end wall in generally horizontal position when in such container-lining relationship, and second attaching means spaced from the first attaching means and also spaced from the opposite ends of the body a distance at least as great as the axial extent of said second membrane and securing the rim of said second membrane to the walls of said body substantially in an upright plane, the discharge port being located between said second attaching means and the first attaching means.

7. The container defined in claim 1, in which the discharge port is spaced from the attaching means, and the exciting means are disposed between the attaching means and the discharge port.

8. The container defined in claim 1, the exciting means including gas supply means for supplying gas to loosen the material.

9. The container defined in claim 8, in which the gas supply means includes a panel having a surface member of porous material through which the gas passes upwardly.

10. The container defined in claim 9, in which the surface member porous material is foamed polyethylene.

11. The container defined in claim 1, and membrane-supporting means disposed above the bottom of the body, and extended toward the secured edge portion of the membrane from the discharge port for engagement by the membrane to prevent obstruction of the discharge port by the membrane.

12. The container defined in claim 1, in which the attaching means are located centrally of the container so that the membrane is selectively disposable in lining relationship with both end portions of the container.

13. The container defined in claim 12, and a tube extending longitudinally of the container at one side of the attaching means and within the upper portion of the membrane through which discrete particle material can be supplied to the container.

14. A container for discrete particle material comprising a horizontally elongated body, a flexible cup-shaped membrane adapted to the disposed in container-lining relationship with an end wall of said body and with portions of the top, bottom and side walls of said body, and having an end wall in upright position when in such container-lining relationship and top and bottom walls extending from said membrane and wall in generally horizontal position when in such container-lining relationship, attaching means spaced from the opposite ends of said body a distance at least as great at the axial extent of said membrane and securing the rim of said membrane to the walls of said body substantially in an upright plane, discharge means including a discharge port located at the bottom of said body at the side of said attaching means opposite said membrane end wall in container-lining relationship and closer to said attaching means than the distance between said attaching means and said membrane end wall when in such container-lining relationship, means for applying differential fluid pressure to said membrane for inverting it relative to said attaching means from container-lining relationship into a position overlying said discharge port for dumping material from the interior of said membrane toward said discharge port, and membrane-supporting means disposed above the bottom of said body and located at the discharge port side of said attaching means for engagement by said membrane to prevent said membrane from obstructing movement of material to said discharge port.

15. The container defined in claim 14, in which the membrane-supporting means is a ledge.

16. The container defined in claim 15, in which the attaching means are spaced from the discharge port and the ledge extends substantially continuously from the attaching means to the discharge port.

17. The container defined in claim 16, in which the ledge includes a flange element and a web element beneath and supporting said flange element, and a fluidizing floor panel disposed alongside said web element.

18. The container defined in claim 17, in which the floor panel is removable from its location alongside the web element.

19. The container defined in claim 14, in which the membrane-supporting means includes a plurality of spaced strips supported above the bottom of the body.

20. A container for discrete particle material comprising a horizontally elongated body having a discharge port in its lower portion, two cup-shaped membranes, two attaching means disposed at opposite sides of said discharge port, respectively, and securing the rims of said membranes, respectively, in sealing relationship along the wall of said body substantially in upright planes, each of said attaching means being spaced from the end walls of said body a distance at least as great as the axial extent of its respective membrane, each of said membranes being adapted to be disposed in lining relationship to the corresponding end of said body, means for applying differential fluid pressure to each of said membranes for shifting such membrane from its lining relationship toward the opposite end of said body into inverted position relative to its attaching means and disposed in overlying relationship to said discharge port, and exciting means disposed between said attaching means and operable to loosen discrete particle material overlying said exciting means and increase the effectiveness of the component of the force of gravity acting toward said discharge port to effect movement of such material to said discharge port.

References Cited

UNITED STATES PATENTS

| | | | |
|---|---|---|---|
| 1,743,056 | 1/1930 | Whitaker | 222—389 X |
| 2,097,985 | 11/1937 | Maryott | 222—189 X |
| 2,736,356 | 2/1956 | Bender et al. | 222—386.5 X |
| 2,865,541 | 12/1958 | Hicks | 222—386.5 |
| 2,912,004 | 11/1959 | Meredew | 222—386.5 X |
| 2,170,258 | 8/1939 | Borch | 222—202 |
| 2,478,777 | 8/1949 | Norbom | 302—53 |
| 2,621,719 | 12/1952 | Eaton et al. | 222—386.5 X |
| 2,660,341 | 11/1953 | Norbom | 222—199 |
| 2,676,605 | 4/1954 | Meredew. | |
| 2,758,747 | 8/1956 | Stevens | 222—386.5 X |
| 2,931,523 | 4/1960 | Nelligan | 214—82 |
| 2,956,839 | 10/1960 | Hermanns | 222—193 X |
| 2,984,392 | 5/1961 | Wadenby | 222—386.5 |
| 3,112,845 | 12/1963 | Bryant | 222—386.5 X |
| 3,253,750 | 5/1966 | Paton | 222—203 X |

FOREIGN PATENTS

| | | |
|---|---|---|
| 221,562 | 5/1959 | Australia. |
| 674,450 | 11/1963 | Canada. |

ROBERT B. REEVES, *Primary Examiner.*

K. LEIMER, *Assistant Examiner.*

U.S. Cl. X.R.

222—135, 263, 330, 386.5; 302—53

UNITED STATES PATENT OFFICE
CERTIFICATE OF CORRECTION

Patent No. 3,421,663            January 14, 1969

Hamilton Neil King Paton

It is certified that error appears in the above identified patent and that said Letters Patent are hereby corrected as shown below:

Column 20, line 7, "extended" should read -- extending --; line 27, "and" should read -- end --.

Signed and sealed this 17th day of March 1970.

(SEAL)
Attest:

Edward M. Fletcher, Jr.            WILLIAM E. SCHUYLER, JR.
Attesting Officer            Commissioner of Patents